United States Patent [19]

Jannard et al.

[11] 4,416,166
[45] Nov. 22, 1983

[54] HANDLE GRIP

[75] Inventors: James H. Jannard, Laguna Niguel; George J. Tackles, San Jose, both of Calif.

[73] Assignee: Oakley, Inc., Irvine, Calif.

[21] Appl. No.: 363,631

[22] Filed: Mar. 30, 1982

[51] Int. Cl.³ .............................................. B62K 21/26
[52] U.S. Cl. .................................... 74/551.9; D8/303
[58] Field of Search ................... 74/551.9, 558, 558.5; D8/303; 16/DIG. 12, 110 R; 273/75, 81 R, 67 DB; 280/821

[56] References Cited

U.S. PATENT DOCUMENTS

| | | |
|---|---|---|
| D. 144,446 | 4/1946 | Black . |
| D. 231,044 | 3/1974 | Morris . |
| D. 242,984 | 1/1977 | Petty . |
| D. 245,064 | 7/1977 | Petty . |
| D. 246,758 | 12/1977 | Ukai ................................. D8/303 |
| D. 248,616 | 7/1978 | Johnson . |
| 490,459 | 1/1893 | Straus ................. 74/551.9 |
| 570,186 | 10/1896 | Rockwell ............. 74/551.9 |
| 583,497 | 6/1897 | Merry .................. 74/551.9 |
| 596,049 | 12/1897 | Bullock ................ 74/551.9 |
| 599,084 | 2/1898 | Wiens .................. 74/551.9 |
| 2,560,900 | 7/1951 | Shultz . |
| 3,016,763 | 1/1962 | Albert . |
| 3,179,435 | 4/1965 | Miller . |
| 3,189,069 | 6/1965 | Stowell . |
| 3,344,684 | 10/1967 | Steere, Jr. et al. . |
| 4,031,775 | 6/1977 | Petty . |
| 4,091,497 | 5/1978 | Bade . |
| 4,308,762 | 1/1982 | Jannard . |

FOREIGN PATENT DOCUMENTS

| | | |
|---|---|---|
| 20374 | of 1893 | United Kingdom ............... 74/551.9 |
| 330243 | 6/1930 | United Kingdom . |
| 630295 | 10/1949 | United Kingdom . |

Primary Examiner—Kenneth Dorner
Attorney, Agent, or Firm—William W. Haefliger

[57] ABSTRACT

A two part grip for the handle of a bicycle or motorcycle or the like comprises:
(a) an inner support sleeve adapted to fit on and grip the handle, and
(b) an outer sleeve fitted over the inner sleeve and positioned to be comfortably grasped by the user.

The sleeves may be interlocked, as by tongue and groove elements, the groove elements for example being defined by holes in the outer sleeve that also serve as a tread. The two sleeves may have differential hardnesses for better grip support, and more comfortable gripping by the user.

11 Claims, 9 Drawing Figures

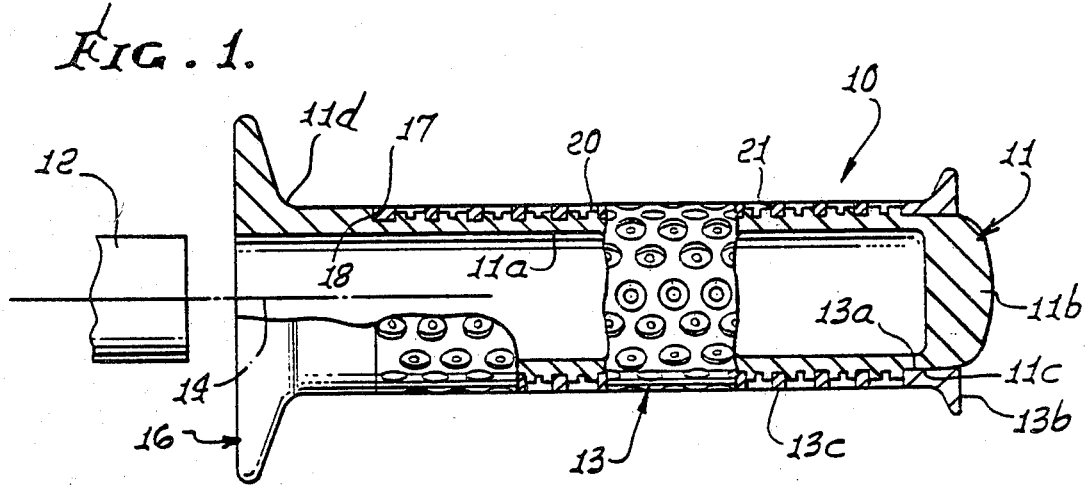
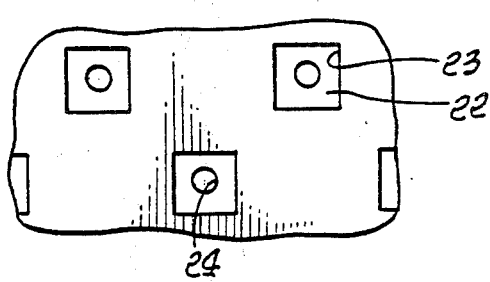
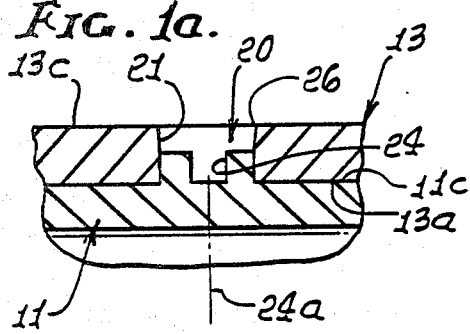
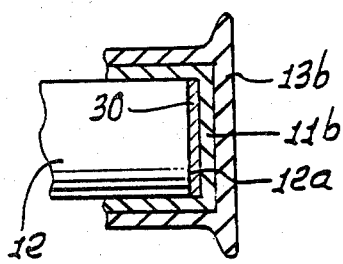
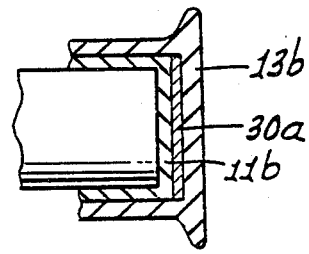
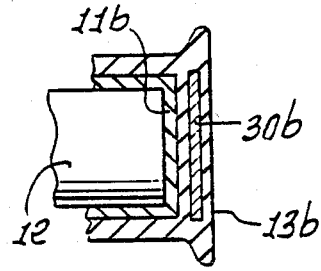
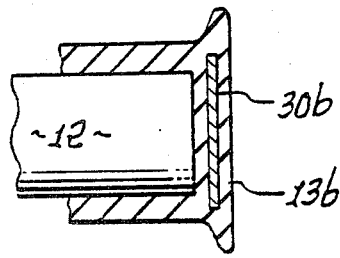
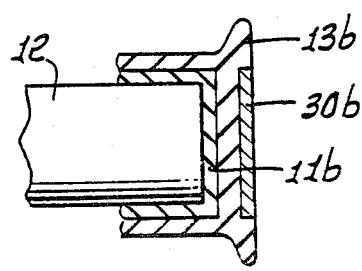
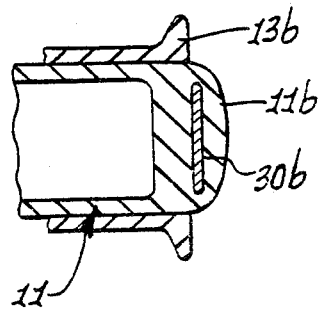

HANDLE GRIP

BACKGROUND OF THE INVENTION

This invention relates generally to hand grips used on bicycles, motorcycles and the like, and more particularly concerns a grip which provides improved support and wear in a metallic handle, more comfort and traction to the user, and protection against damage due to cutting of the grip by the handle end.

Non-metallic hand grips are more easily assembled to metallic handles and have longer wear lives on such handles if the grips are made of harder elastomeric material; on the other hand, they are more comfortable to the user if made of less hard elastomeric material. However, in the latter event, the sharp ends of metallic handles tend to cut into the end caps on the grips and destroy their utility.

There is a continuing need for grips which will overcome the above problems and provide the desirable features of stability, longer life, comfort, and yet have light weight.

SUMMARY OF THE INVENTION

It is a major object of the invention to provide a substantially improved grip of new design, and which will meet the above needs. Basically, this objective is met by a grip characterized by
 (a) an inner support sleeve adapted to fit on and grip the handle, and
 (b) an outer sleeve fitted over the inner sleeve and positioned to be comfortable grasped by the user.

As will appear, the sleeves are typically interlocked, as for example by tongue and groove elements on the respective sleeves; and the outer sleeve is made of relatively less hard material, and the inner sleeve of relatively harder material. Further, the groove elements may comprise holes through the outer sleeve to receive protrusions outstanding from the inner sleeve, and in such manner that the cushioning effect of the outer sleeve is enhanced and better gripping is achieved by the hole tread design, without interference from the harder protrusions which interlock to the holes to hold the sleeves together, as will appear.

It is a further objective to provide shielding at the cap end or ends of the sleeves to inhibit or prevent the handle end from cutting through the sleeve end or ends.

These and other objects and advantages of the invention, as well as the details of an illustrative embodiment, will be more fully understood from the following specification and drawings, in which:

DRAWING DESCRIPTION

FIG. 1 is a side elevation, partly in section, showing a hand grip incorporating the invention;

FIG. 1a is an enlarged fragmentary section showing interlocking of inner and outer sleeves, and employed in the FIG. 1 grip;

FIG. 2 is a plan view of a grip incorporating a varied interlock configuration; and FIGS. 3-8 are fragmentary side elevations, in section, showing modifications.

DETAILED DESCRIPTION

In FIGS. 1 and 1a, the hand grip 10 includes an elongated body that comprises an inner support sleeve 11 adapted to fit on and grip a handle 12 of a motorcycle or bicycle, and an outer sleeve 13 fitted over the inner sleeve and positioned to be comfortably gripped by the rider. The two sleeves are typically interlocked by interengaged surfaces acting to locate the outer sleeve in fixed position relative to the inner sleeve. Sleeve 11 has a cylindrical bore 11a defining an elongated axis 14, and both sleeves are substantially co-axial. Bore 11a is sized to receive the bicycle or motorcycle handle. Handles of other objects may also be received in bore 11a. Sleeve 11 typically has a thickened end cap 11b that limits insertion of handle 12, and that projects through the flanged end 13b of sleeve 13, for increased protection purposes. Sleeve 13 has a bore 13a fitting an outer surface 11c of sleeve 11, and outer surface 13c of sleeve 13 is exposed to the exterior.

At one end of inner sleeve 11 is an annular flange 16 which is integral with that sleeve. A step shoulder 17 on sleeve 11, facing rightwardly in FIG. 1, abuts the left end 18 of outer sleeve 13, as shown, and outer cylindrical surface 13c is flush with outer cylindrical surface 11d of sleeve 11, surface 11d extending between flange 16 and step shoulder 17.

Typically, the sleeves consists of non-metallic, compressible material, with the outer sleeve being less hard (20-60 Durometer, A scale) than the inner sleeve (60-90 Durometer, A scale) whereby the inner sleeve provides firm support on the handle 12, whereas the outer sleeve provides comfort to the user. Both sleeves may advantageously consist of elastomeric material, such as rubber.

The interfitting or interlocking of the two sleeves is typically provided by multiple tongue and groove elements on the sleeves, and one or both series of such elements may also provide a comfortable tread on the grip, to be engaged by the hand of the user. Multiple functions are thereby achieved, in a highly advantageous and compact manner. For example, such elements may comprise multiple protuberances 20 integral with the inner sleeve and projecting outwardly from its surface; and multiple openings or holes 21 in the outer sleeve, extending through the wall of that sleeve. The protuberances and holes may have matching or interengaged cylindrical outline curvature, as appears in FIGS. 1 and 1a; or they may have square or rectangular shape at 22 and 23 as seen in FIG. 2, or other polygonal shape, in planes normal to radii 24a from axis 14, as shown in FIG. 1a. Protuberances 20 and 22 may have central recesses as at 24, lightening them and adapting them to fit better in openings 21 and 23. The protuberances are spaced axially along the length of sleeve 11, and about axis 14 and the matching holes 21 are spaced axially along the length of sleeve 13 and about axis 14, and may have the pattern as shown. Note that the protuberances are everywhere spaced below or inwardly of the cylinder defined by the outer surface 13c of sleeve 13, whereby the harder, less comfortable material of sleeve 11 does not engage the user's hand over the major length of the grip. Such spaces also allow outer rim edges 26 of the holes 21 to deflect sidewardly into the holes in response to hand gripping, increasing the comfortable cushioning effect. Sleeve 11, being harder, fits more easily onto the handle 12, and its harder end 11b provides grip end protection.

FIG. 3 shows a modification of the two-sleeve grip wherein a guard shield 30 of relatively hard plastic or metallic material is located adjacent the inner side of end cap 11b, to engage the end 12a of metallic handle 12, and prevent cutting of cap 11b by that handle end.

Shield 30 may consist of hard molded plastic, and be disc-shaped.

In FIG. 4, the shield 30a is located between end cap 11b and end cap 13b; in FIGS. 5 and 6 the shield 30b is located and concealed in end cap 13b (end cap 11b being omitted in FIG. 6); and in FIG. 7 the shield 30a is located in end cap 13b), but exposed rearwardly, as shown.

Note that the shields have diameters at least about as large as or greater than the handle diameter, to block cutting force transmission by the outer edge of the handle.

Sleeves 11 and 13 may have different colors, to enable the user to grasp the softer outer sleeve 13, for comfort.

In FIG. 1, the end 11b of sleeve 11 provides grip end protection due to its projection, as shown. It may contain a protective shield, as at 30b in FIG. 8.

We claim:

1. A two-part grip for a handle defined by a bicycle or motorcycle, or the like, comprising
   (a) a one piece lengthwise elongated inner support sleeve adapted to fit on and grip the handle, and
   (b) a one piece lengthwise elongated outer sleeve fitted over the inner sleeve and positioned to be comfortably grasped by the user, the outer sleeve having an outer surface and there being an exterior zone adjacent said outer sleeve,
   (c) and protuberances integral with the inner sleeve and holes extending radially through the outer sleeve, the protuberances received in the holes,
   (d) the protuberances spaced apart lengthwise of said sleeves and also spaced apart circumferentially of said sleeves, the protuberances having surfaces exposed to said exterior zone via said holes which are also spaced apart lengthwise and circumferentially of the sleeves,
   (e) the sleeves closely interfitting one another lengthwise between and circumferentially between said spaced protuberances,
   (f) both sleeves being non-metallic and the said surfaces of the protuberances being inwardly of a cylinder defined by said outer surface of the outer sleeve.

2. The grip of claim 1 wherein the inner sleeve consists of an elastomer which is harder than the outer sleeve.

3. The grip of claim 1 wherein the outer sleeve consists of an elastomer that is less hard than the inner sleeve.

4. The grip of claim 1 wherein both sleeves are elastomeric.

5. The grip of claim 1 wherein each sleeve has an end cap, and including a shield located between said end caps.

6. The grip of claim 1 wherein each sleeve has an end cap, and including a shield located in one of said end caps.

7. The grip of claim 6 wherein the shield has a face exposed to the exterior.

8. The grip of one of claims 1-4 wherein one of said sleeves has an end, and including a shield of relatively hard material at said end, to be in alignment with said handle.

9. The grip of claim 8 wherein the shield is concealed in said end.

10. The grip of claim 1 wherein the inner support sleeve has an end cap projecting through an open end defined by the outer sleeve.

11. The grip of claim 10 including a protective shield carried by said end cap of the inner sleeve.

* * * * *